United States Patent [19]

Luoma et al.

[11] Patent Number: 5,534,476
[45] Date of Patent: Jul. 9, 1996

[54] USE OF A SUPER ALLOY AS A SUBSTRATE FOR CATALYSTS

[75] Inventors: Marjo Luoma; Keijo Torkkell, both of Oulu; Reijo Lylykangas; Pirkko Virta, both of Vihtavuori, all of Finland

[73] Assignee: Kemira Oy, Espoo, Finland

[21] Appl. No.: 264,587

[22] Filed: Jun. 23, 1994

Related U.S. Application Data

[63] Continuation of Ser. No. 923,931, Oct. 26, 1992, abandoned, filed as PCT/FI92/00001, Jan. 2, 1992 published as WO92/11936, Jul. 23, 1992.

[30] Foreign Application Priority Data

Jan. 3, 1991 [FI] Finland ............................ 910029

[51] Int. Cl.⁶ .............................. B01J 21/02; B01J 23/74
[52] U.S. Cl. ...................... 502/335; 502/315; 502/316; 502/320; 502/322; 502/351; 502/439; 502/527; 423/213.5
[58] Field of Search ........................... 502/439, 527, 502/315, 316, 320, 322, 351

[56] References Cited

U.S. PATENT DOCUMENTS

| 4,318,888 | 3/1982 | Chapman et al. | 502/314 |
| 4,601,999 | 7/1986 | Retallick et al. | 502/314 |
| 4,820,678 | 4/1989 | Xu | 502/524 X |
| 4,829,655 | 5/1989 | Cornelison et al. | 29/527.4 |
| 4,931,421 | 6/1990 | Shibata | 502/439 |
| 5,047,381 | 9/1991 | Beebe | 502/308 X |

FOREIGN PATENT DOCUMENTS

| 0255625 | 2/1988 | European Pat. Off. . |
| 0348575 | 1/1990 | European Pat. Off. . |
| 0370244 | 5/1990 | European Pat. Off. . |
| 881372 | 3/1988 | Finland . |
| 34404998 | 5/1985 | Germany . |

OTHER PUBLICATIONS

Dialog Information Services, File 351, World Patent Index 81–92, Dialog Accession No. 003682968, WPI Accession No. 83–42942K/18, Shimizu S.: "Catalyst for IC engine intake and exhaust system comprising alloy contg. nickel, chromium, molybdenum, niobium, iron and aluminium", JP 58051941, A, 830326, 8318 (Basic).

*Primary Examiner*—Anthony McFarlane
*Attorney, Agent, or Firm*—Pennie & Edmonds

[57] ABSTRACT

A metal alloy in which the highest individual metal concentration is nickel and which always includes at minimum 4% by weight aluminum is used as the substrate for catalysts for purifying exhaust gases. Chromium, iron, cobalt, molybdenum and titanium are among the other metals possible.

6 Claims, 2 Drawing Sheets

USE OF A SUPER ALLOY AS A SUBSTRATE FOR CATALYSTS

This is a continuation of application Ser. No. 07/923,931, filed as PCT/FI92/00001 on Jan. 2, 1992, published as WO92/11936 on Jul. 23, 1992, now abandoned.

The invention relates to the use of a nickel-based metal alloy, known per se, as a substrate for exhaust-gas catalysts. In the metal composition used, the proportion of nickel is the largest among the individual constituents, and it always contains at minimum 4% by weight aluminum and possibly other metals. The wording "possibly other metals" means small amounts of, i.a., iron, cobalt, molybdenum, titanium, etc., but possibly a larger amount of chromium.

The preparation of a metallic exhaust-gas catalyst starts with the selection of a metal foil. All the metal foils used include some aluminum. In the annealing step this aluminum "migrates" to the surface of the foil, forming a thin oxide layer onto which the support material is applied. This oxide layer thickens during the annealing, as oxygen and metals diffuse through it. The chromium present in a steel foil alloy, together with the aluminum, protects the steel from oxidation.

Onto the surface of the support structure thus obtained there is applied a thermally stable oxide layer having a large specific surface, the oxide generally being, for example, $\gamma$-$Al_2O_3$.

In general, the materials used as the carrier, the metallic monolith, for automobile exhaust-gas catalysts are metal alloys the principal components of which are iron, chromium, and aluminum.

U.S. Pat. No. 4,318,888 presents as an example of the metallic foil an iron-based foil containing 15% by weight chromium, 4% by weight aluminum, and 0.5% by weight yttrium.

The objective to develop metal alloys which withstand heat corrosion and additionally have a good resistance to flow has led to the preparation of so-called super alloys. It is typical of these metals that they have a large chromium content, as well as aluminum, titanium and refractory metal alloying. Super alloys are typically used in industrial gas turbines and in airplane engine parts. Super alloys are classified into iron-based, nickel-based, and cobalt-based alloys.

Super alloys are by structure austenitic (face-centered cubic crystal structure (p.k.k.)), having typically good mechanical properties as compared, for example, with body-centered cubic metals. The most important factor is probably the ability of austenite to dissolve other elements into the matrix and the possibility to precipitate, in a controlled manner, intermetallic compounds such as $\gamma'$-$Ni_3Al$.

Normally the substrates used for metal-substrate exhaust-gas catalysts are aluminum-containing iron-chromium alloys in which the resistance to oxidation is based on a protecting aluminum oxide layer. In a normal automobile exhaust-gas environment the said materials give the catalyst sufficient mechanical endurance and corrosion resistance. The advantage of iron-based alloys over nickel-based and cobalt-based alloys is that they are economical and have a lower density.

In certain applications, for example in catalysts for power saws and in so-called starting catalysts to be installed very close to the exhaust manifold, the temperature may rise above 1000° C., in which case, in a strongly vibrating load situation, iron-based metal alloys are not sufficiently durable mechanically (Example 2). This is due to the instability of the phase structure of iron-based alloys at high temperatures, especially when the alloy contains high concentrations of chromium and aluminum. The stability of the alloy can be improved by replacing part of the iron by nickel. With nickel-based alloys the situation is advantageous, since the p.k.k. crystal structure which provides good high-temperature strength properties is stable in all compositions.

U.S. Pat. No. 4,601,999 discloses an iron-based metal substrate for catalysts, wherein the aluminum content is limited to 3% by weight owing to technical problems in manufacturing. In the metal substrate according to the invention the aluminum content is at minimum 4% by weight and the metal alloy is nickel-based. Likewise, in the patent DE-3 440 498 the metal alloy is iron-based.

A study of various metal alloys showed that, in very thin, 0.03–0.10 mm, foil strips used in exhaust-gas catalysts, resistance to oxidation has a more significant effect on the mechanical endurance of the substrate than do the high-temperature strength values of the foil. The resistance of cobalt-chromium and nickel-chromium alloys to heat corrosion is based on a chromium oxide layer which forms on the surface in oxidizing conditions when the aluminum content in the alloys is low. The chromium oxide layer does not in an oxidizing atmosphere sufficiently protect the base metal at high temperatures, above 800° C. One example of such alloys which can be mentioned is Hastelloy X (alloy 2), which has good hot strength values but not sufficient resistance to oxidation (Examples 1 and 2). For this reason, an oxide layer containing a large amount of aluminum can be regarded as necessary in order that the metal substrate endure chemically and mechanically under special conditions.

The advantages of the commonly used iron-aluminum-chromium alloy are good resistance to oxidation at high temperatures strength at normal operating temperatures When the temperatures rises above 700° C., the strength of such an alloy foil decreases crucially, and the remaining strength is approximately 30% of its strength at 20° C.

Now it has been surprisingly observed that, when a metal alloy in which the nickel content is higher than the content of any other metal in the alloy and which additionally contains aluminum at minimum 4% by weight and possibly other metals is used as a thin foil, this foil resists well heat corrosion while its resistance to oxidation is sufficient, and additionally the mechanical endurance of the foil at the high temperatures used and under strongly vibrating load situations is good. Upon oxidizing the material does not become brittle; its elongation values remain good. The nickel concentration in the metal alloy is preferably higher than 40% by weight and its aluminum concentration is preferably approx. 4–6% by weight.

One advantageous alloy according to the invention which has been used is a Ni-Cr-Al alloy. When this foil is annealed, an $Al_2O_3$—$Cr_2O_3$ layer, or in certain conditions an almost pure $Al_2O_3$ layer, is obtained. Internal oxidation of aluminum within the wide ranges of partial oxygen pressure and temperature can be avoided by regulating the chromium concentration.

This is important, especially if the protecting oxide layer formed in optimum conditions is damaged, and the damage must be self-corrected during operation. The adhesion and density of the aluminum oxide layer which protects the surface can be improved by alloying the aluminum-containing metals with a small amount of rare earth metals.

It is possible to precipitation harden the nickel-chromium-aluminum alloys usable for the purposes according to the invention by means of intermetallic $\gamma'$ compounds; this gives these alloys unique mechanical properties up to a temperature of approx. T=(0.8×melting temperature), the γ′ precipitations dissolving in the matrix. In nickel-based alloys, high compatibility between the matrix and coherent γ′ precipitations ensures long-term stability of the structure. In a nickel-based alloy, γ′ is typically of the form $(Ni,Co)_3(Al, Ti)$, in which nickel and aluminum are dominant. In iron- and cobalt-based alloys, owing to the lower stability of the structures, a similar strengthening mechanism cannot be exploited as effectively. In an exhaust-gas atmosphere, in a mechanically severe load situation, and at high temperatures, above 900° C., in long-term use, the γ′ precipitations, together with an excellent resistance to oxidation, render aluminum-alloyed nickel-based alloys superior to other alloys.

The thermal expansion coefficients of nickel-based alloys are lower than those of iron-based alloys. This is advantageous in terms of the adhesion of the catalytic support layer to be sprayed onto the surface of the metal, since a better compatibility of the thermal expansion coefficients reduces thermal stresses. The adhesion of the catalytic support to the surface of a nickel-chromium-aluminum alloy is very good also for the reason that the aluminum oxide layer formed on the surface of the foil strip during annealing serves as an intermediate layer between the base metal and the support material, improving the physical adhesion of the aluminum-oxide-containing support to the substrate.

Experiments have shown the excellent strength properties of the metal alloy foil material according to the invention in hot oxidizing conditions.

BRIEF DESCRIPTION OF THE DRAWINGS

The invention is described below in greater detail, with the help of examples, with reference to the accompanying figures, in which.

The following examples illustrate the advantages of the so-called super alloy according to the invention as compared with the alloys currently used when using in catalysts thin foils made of such alloys.

EXAMPLE 1

Figure 1:
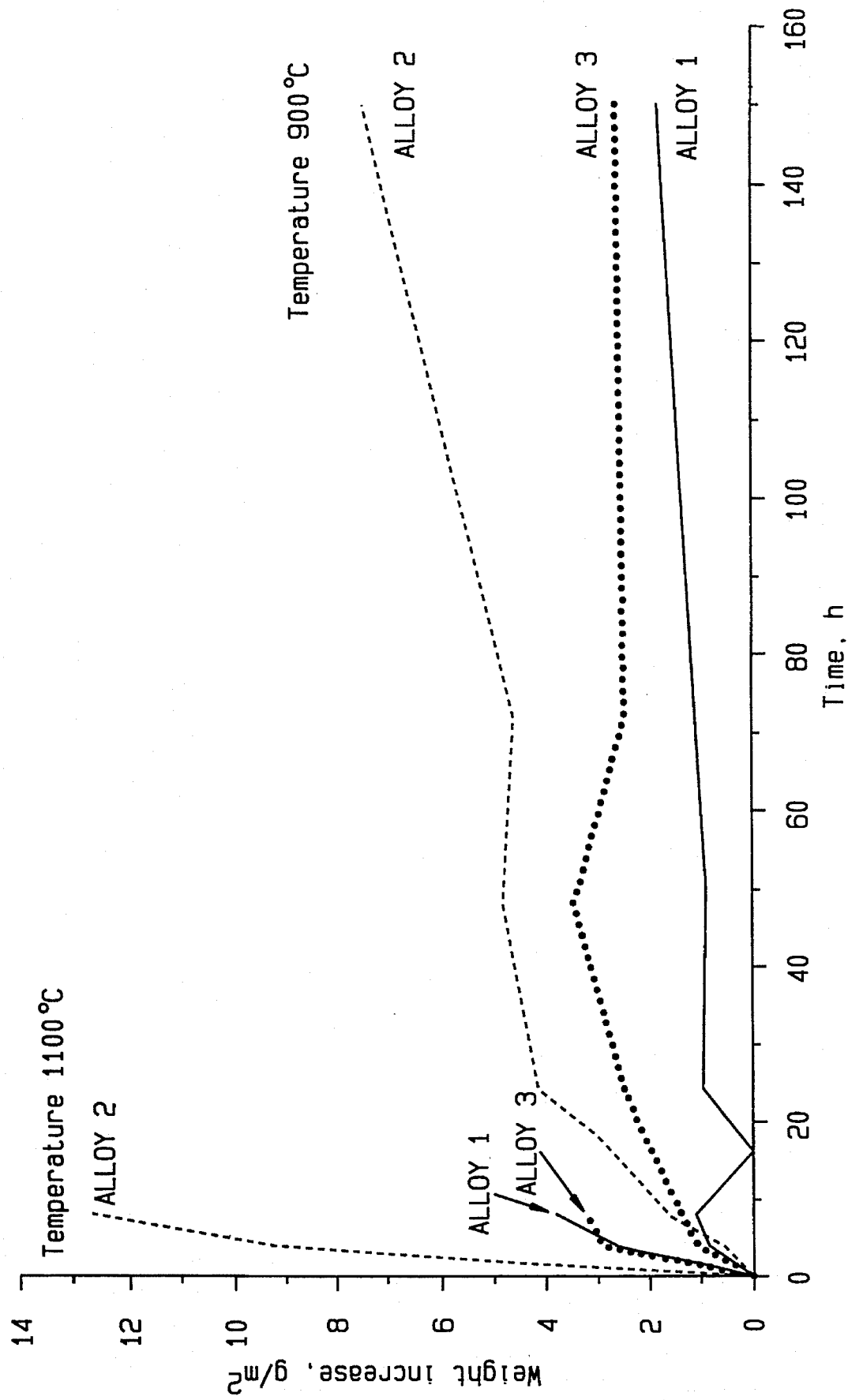
FIG. 1 is a graphical representation of the results obtained from the comparison tests.

Three commercial metal alloys were selected as the alloys to be investigated, of which alloys 2 and 3 are so-called super alloys and alloy 1 is a material which has been much used in catalysts. Alloy 1 is an iron-chromium-aluminum alloy (VDM ISE), alloy 2 is a nickel-chromium-iron-molybdenum alloy (Hastelloy X), and alloy 3 is a nickel-chromium-aluminum-iron alloy (Haynes Alloy 214). The compositions of the alloys are shown in Table 1. Specimens of 200×75×0.05 mm of each alloy were annealed in an annealing furnace in an atmosphere of air at a temperature of 900° C. for 4, 8, 16, 24, 48, 72 and 150 hours, and at 1100° C. for 4 and 8 hours. The results obtained are shown in FIG. 1, from which it can be observed that the weight increase of the aluminum-containing alloys 1 and 3 as a function of time is considerably less than that of the chromium-containing alloy 2. The chromium oxide layer formed on the surface of alloy 2 does not provide sufficient protection; the specimen oxidized throughout during annealing at 1100° C. This shows clearly that aluminum alloying is indispensable in order that the oxide layer on the surface protect the base metal from oxidation at temperatures as high as these.

TABLE 1

Alloys investigated (*maximum concentration)

| Component | CONCENTRATION, % | | |
|---|---|---|---|
| | Alloy 1 | Alloy 2 | Alloy 3 |
| Ni | — | bal. | bal. |
| Co | 0.5* | 0.50–2.50 | — |
| Cr | 20–22 | 20.50–23.00 | 16.0 |
| Mo | — | 8.00–10.00 | — |
| W | — | 0.20–1.00 | — |
| Fe | bal. | 17.00–20.00 | 3.0 |
| C | 0.05* | 0.05–0.15 | — |
| Si | 0.60* | 1.00* | — |
| Mn | 0.40* | 1.00* | — |
| B | — | 0.008* | — |
| Ti | — | 0.15* | — |
| Al | 4.8–5.5 | 0.50* | 4.5 |
| Cu | — | 0.50* | — |
| P | — | 0.040* | — |
| S | — | 0.030* | — |
| Y | — | — | some |

Besides resistance to oxidation, the metal foil should also have mechanical endurance within high temperature ranges. This was experimented with using the alloy according to the invention, reference alloys also being included in the trials.

In the following example, the endurance of three alloys was investigated when they were used as catalytic materials as the base of the metal foil.

EXAMPLE 2

Figure 2:
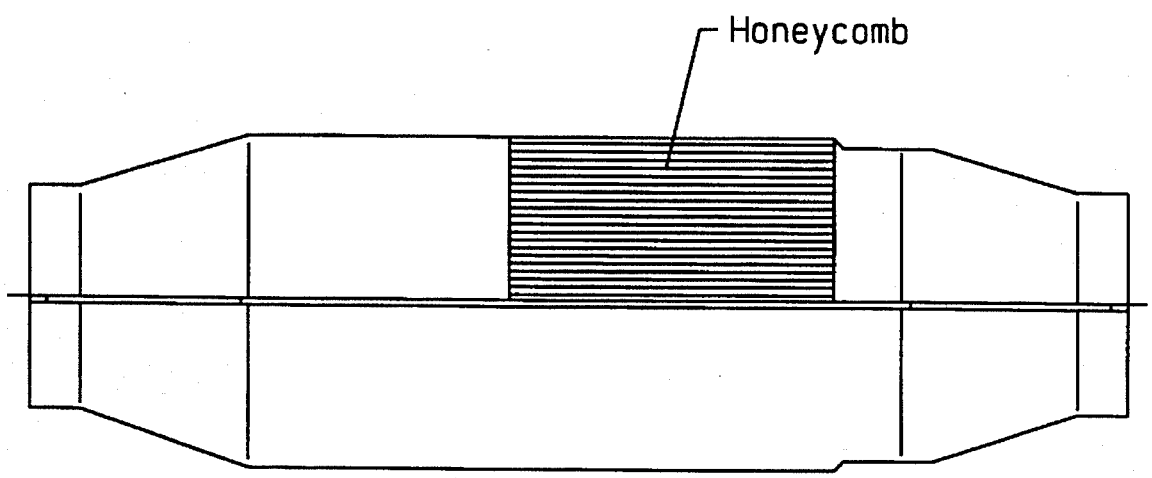
FIG. 2 depicts a catalyst honeycomb in which a metal foil according to the invention has been used as the substrate.

The catalyst honeycombs of FIG. 2 were prepared from the alloys of Example 1, and the mechanical endurance of the honeycombs was tested using a vibration apparatus (Ling Electronics, Inc. Model DMA 5-5/A 395). The test conditions were:

acceleration 40 g frequency 90 Hz temperature 930° C.

The results obtained are presented as relative periods of endurance in Table 2. Only the catalytic honeycomb prepared from alloy 3 is sufficiently durable in conditions as demanding as these.

TABLE 2

Relative endurance periods in the mechanical test.

| | Alloy 1 | Alloy 2 | Alloy 3 |
|---|---|---|---|
| Horizontal shaking | 1 | 1.2 | 4.4 |
| Vertical shaking | 1 | 8.0 | >8 |

According to the results, the alloy prepared without nickel has properties inferior to those of the alloy containing a large amount of nickel. Furthermore, according to the results the presence of aluminum is indispensable.

It is observed surprisingly that when a thin foil strip made of alloy 3 is used as the base metal for the catalyst, a good strength is obtained at temperatures above 900° C. The resistance to oxidation is also good.

We claim:

1. A catalytic alloy substrate for purifying exhaust gases, consisting essentially of a roll-formed, thin, nickel-based metal foil having at least 4% by weight aluminum, wherein the highest individual metal concentration in the metal alloy is nickel, its concentration being higher than 40% by weight, and the thickness of the foil is about 0.03–0.1 mm, wherein said substrate has a catalyst support layer in integral contact with said substrate.

2. catalytic alloy substrate for purifying exhaust gases, consisting essentially of a roll-formed, thin, nickel-based metal foil having at least 4% by weight aluminum, an amount of metals of iron, cobalt, molybdenum, or titanium, an amount of chromium, and nickel in an amount of higher than 40% by weight, wherein the highest individual metal concentration in the metal alloy is nickel, the amount of chromium is larger than the amount of iron, cobalt, molybdenum or titanium, the thickness of the foil is about 0.03–0.1 mm, and said substrate has a catalyst support layer in integral contact with said substrate.

3. A catalytic alloy substrate according to claim 2, wherein the proportion of aluminum is within the range 4–6% by weight.

4. The catalytic alloy substrate according to claim 1, wherein the aluminum is present in an amount of between about 4 and 6 weight percent.

5. The catalytic alloy substrate according to claim 1, wherein the nickel is present in an amount of at least about 50.522 weight percent.

6. The catalytic alloy substrate according to claim 1, wherein said metal foil is resistant to oxidation in air at a temperature of at least about 900° C.

* * * * *